US012071695B2

(12) United States Patent
Wang

(10) Patent No.: US 12,071,695 B2
(45) Date of Patent: Aug. 27, 2024

(54) METHOD FOR INCREASING MAGNETIC INDUCTION INTENSITY OF SOFT MAGNETIC METALLIC MATERIALS

(71) Applicants: Jingran Wang, Beijing (CN); Jiahao Wang, Beijing (CN); Jiahui Wang, Beijing (CN)

(72) Inventor: Jingran Wang, Beijing (CN)

(73) Assignees: Jingran Wang, Beijing (CN); Jiahao Wang, Beijing (CN); Jiahui Wang, Beijing (CN)

( * ) Notice: Subject to any disclaimer, the term of this patent is extended or adjusted under 35 U.S.C. 154(b) by 196 days.

(21) Appl. No.: 17/293,902

(22) PCT Filed: Nov. 13, 2019

(86) PCT No.: PCT/CN2019/117840

§ 371 (c)(1),
(2) Date: May 13, 2021

(87) PCT Pub. No.: WO2020/098667

PCT Pub. Date: May 22, 2020

(65) Prior Publication Data

US 2022/0018010 A1 Jan. 20, 2022

(30) Foreign Application Priority Data

Nov. 14, 2018 (CN) ......................... 201811355733.1
Feb. 20, 2019 (CN) ......................... 201910125908.8
Mar. 22, 2019 (CN) ......................... 201910221888.4

(51) Int. Cl.

| | |
|---|---|
| ***C23C 8/44*** | (2006.01) |
| ***C23C 8/20*** | (2006.01) |
| ***C23C 8/24*** | (2006.01) |
| ***C23C 8/30*** | (2006.01) |
| ***C23C 8/48*** | (2006.01) |
| ***C23C 8/54*** | (2006.01) |
| ***C23C 8/64*** | (2006.01) |
| ***C23C 8/74*** | (2006.01) |
| ***H01F 1/12*** | (2006.01) |
| ***H01F 1/18*** | (2006.01) |
| ***H01F 41/02*** | (2006.01) |

(52) U.S. Cl.

CPC .................. *C23C 8/44* (2013.01); *C23C 8/20* (2013.01); *C23C 8/24* (2013.01); *C23C 8/30* (2013.01); *C23C 8/48* (2013.01); *C23C 8/54* (2013.01); *C23C 8/64* (2013.01); *C23C 8/74* (2013.01); *H01F 1/12* (2013.01); *H01F 1/18* (2013.01); *H01F 41/0206* (2013.01)

(58) Field of Classification Search

CPC .... C23C 8/44; C23C 8/54; C23C 8/30; C23C 8/20; C23C 8/64; C23C 8/24; C23C 8/48; C23C 8/74; H01F 1/12; H01F 1/18; H01F 41/0206

See application file for complete search history.

(56) References Cited

U.S. PATENT DOCUMENTS 4,016,012 A * 4/1977 Oshida ..................... C21D 8/00 148/226
7,794,551 B1 * 9/2010 Imbrogno ............. B22F 3/1007 148/209
2005/0221126 A1 10/2005 Hasegawa et al.
2006/0000524 A1 1/2006 Ogawa et al.
2014/0069555 A1 3/2014 Inaguma et al.
2014/0143992 A1 5/2014 Xiong et al.
2014/0149053 A1 5/2014 Sun et al.
2015/0017056 A1 * 1/2015 Kim .......................... B22F 1/00 427/127
2015/0292053 A1 10/2015 Xiong et al.
2015/0318089 A1 * 11/2015 Li ......................... C22C 38/002 148/101

FOREIGN PATENT DOCUMENTS

CN 1061050 A 5/1992
CN 1298456 A 6/2001
CN 1721563 A 1/2006
CN 1759007 A 4/2006
CN 101127267 A 2/2008
CN 100463997 C 2/2009
CN 101549170 A 10/2009
CN 101775547 A 7/2010
CN 101775548 A 7/2010
CN 102517592 A 6/2012
CN 102787282 A 11/2012

(Continued)

OTHER PUBLICATIONS

International search report of PCT application No. PCT/CN2019/117840 issued on Jan. 31, 2020.
First office action of Chinese application No. 201811355733.1 issued on Nov. 6, 2019.
Second office action of Chinese application No. 201811355733.1 issued on May 22, 2020.
Third office action of Chinese application No. 201811355733.1 issued on Nov. 6, 2020.
Zongchang Liu, et al; Heat Treatment Technology; Metallurgical Industry Press; Aug. 31, 2015, p. 107.

(Continued)

*Primary Examiner* — Adil A. Siddiqui

(74) *Attorney, Agent, or Firm* — Knobbe, Martens, Olson & Bear, LLP

(57) ABSTRACT

Provided is a method for increasing magnetic induction intensity of soft magnetic metallic materials. The method includes carburizing or carbonitriding the soft magnetic metallic materials with carbon source or a carbonitriding agent by a heat treatment process, to increase the magnetic induction intensity of the soft magnetic metallic materials, wherein the soft magnetic metallic materials are amorphous materials, nanocrystals, silicon steel, or pure iron.

12 Claims, No Drawings

(56) References Cited

FOREIGN PATENT DOCUMENTS

| | | | |
|---|---|---|---|
| CN | 103911545 | A | 7/2014 |
| CN | 104797732 | A | 7/2015 |
| CN | 105986202 | A | 10/2016 |
| CN | 107746942 | A | 3/2018 |
| CN | 108425003 | A | 8/2018 |
| CN | 109338087 | A | 2/2019 |
| CN | 109735791 | A | 5/2019 |
| CN | 109852919 | A | 6/2019 |
| EP | 1307598 | B1 | 1/2005 |
| IN | 104036899 | A | 9/2014 |
| JP | 847034133 | A | 11/1972 |
| JP | S54114424 | A | 9/1979 |
| JP | H02228425 | A | 9/1990 |
| JP | 2006045662 | A | 2/2006 |
| JP | 2010222696 | A | 10/2010 |
| JP | 2012012706 | A | 1/2012 |
| JP | 2014074234 | A | 4/2014 |
| JP | 2014148723 | A | 8/2014 |
| RU | 2025540 | C1 | 12/1994 |
| RU | 2107745 | C1 | 3/1998 |
| RU | 2253692 | C1 | 6/2005 |
| RU | 2314363 | C1 | 1/2008 |
| RU | 2326461 | C2 | 6/2008 |
| RU | 2418865 | C1 | 5/2011 |
| RU | 2553107 | C2 | 6/2015 |
| SU | 97656 | A1 | 11/1953 |
| SU | 775170 | A1 | 10/1980 |
| SU | 876785 | A1 | 10/1981 |
| SU | 1574680 | A1 | 6/1990 |
| WO | 2011077904 | A1 | 6/2011 |
| WO | 2012147922 | A1 | 11/2012 |

OTHER PUBLICATIONS

Jinghua Liu; Heat Treatment of Steel, Shaanxi Science and Technology Press; May 31, 1981, pp. 276-279.
First office action of Chinese application No. 201910125908.8 issued on Dec. 18, 2019.
Second office action of Chinese application No. 201910125908.8 issued on May 22, 2020.
Decision of rejection of Chinese application No. 201910125908.8 issued on Nov. 9, 2020.
First office action of Chinese application No. 201910221888.4 issued on Feb. 3, 2020.
Second office action of Chinese application No. 201910221888.4 issued on Aug. 26, 2020.
Decision of rejection of Chinese application No. 201910221888.4 issued on Apr. 6, 2021.
Naito Takeshi; Practical Technology of Carburizing and Quenching, Machinery Industry Press; Mar. 1985, p. 4.
Jingpu Zhu, et al; Material Science of Mechanical Engineering, Machinery Industry Press, Apr. 1988, p. 36.
Jilin Ren, et al; Metal Magnetic Memory Detection Technology, China Electric Power Press, Dec. 2000, pp. 35-43.
Livsets, Physical Properties of Metals and Alloys, Metallurgical Industry Publishing; Sep. 1959, p. 154.
China National Intellectual Property Administration, First office action of Chinese application No. 201980075549.8 issued on Apr. 2, 2022, which is foreign counterpart application of this US application.
Electrical Manufacturing Technology 2nd Edition, Meng Qinglong Editor-in-Chief, Machinery Industry Press, Oct. 31, 1992, p. 167.
Laminated Sheet Production, Compiled by the 74th Steel Rolling Workers Training Course and Steel Rolling Teaching and Research Office of Northeast Institute of Technology, Metallurgical Industry Press, Oct. 30, 1977, p. 251.
Extended European search report in EP application No. 19886031.4 issued on Dec. 13, 2021.
China National Intellectual Property Administration, Second office action of Chinese application No. 201980075549.8 issued on Sep. 13, 2022, which is foreign counterpart application of this US application.
Liu Zhilin et al., Statistical values of alloy electronic structure parameters and calculation of alloy mechanical properties, Sep. 30, 2008, pp. 13-14.
Office Action and Search Report of Russian application No. 2021115210 issued on Mar. 29, 2023.
Office action of Brazilian application No. BR112021009247-1 issued on Apr. 3, 2023.
Notice of Reasons for Refusal of Japanese application No. 2021-551328 issued on May 23, 2023.
Lyakhovich L.S. Chemical-thermal treatment of metals and alloys, Moscow, Metallurgy, 1981, p. 14, paragraph 1, p. 15, paragraph 4, p. 18, table 19.
Office Action in Korean application No. 10-2021-7018147 issued on Apr. 9, 2024.
Communication pursuant to Article 94(3) EPC in European application No. 19886031.4 issued on Apr. 16, 2024.

* cited by examiner

METHOD FOR INCREASING MAGNETIC INDUCTION INTENSITY OF SOFT MAGNETIC METALLIC MATERIALS

CROSS-REFERENCE TO RELATED APPLICATIONS

This application is a US national phase application of International application No. PCT/CN2019/117840, filed on Nov. 13, 2019, which claims priority to Chinese Patent Application No. 201811355733.1, filed on Nov. 14, 2018 and entitled "TREATMENT METHOD OF AMORPHOUS STRIP", Chinese Patent Application No. 201910125908.8, filed on Feb. 20, 2019 and entitled "TREATMENT METHOD OF AMORPHOUS MATERIAL AND NANOCRYSTALS", and Chinese Patent Application No. 201910221888.4, filed on Mar. 22, 2019 and entitled "SILICON STEEL TREATMENT METHOD", the contents of each of which are incorporated herein by reference in their entireties.

TECHNICAL FIELD

The present disclosure relates to the field of metallic materials, and in particular, to a method for processing soft magnetic metallic materials.

BACKGROUND

Soft magnetic metallic materials, such as amorphous materials, nanocrystals, silicon steel, pure iron powder, or a mixture thereof, are widely applied in the field of electricity. Particularly, amorphous strips may be applied in electrical equipment such as motors and transformers, so that losses can be significantly reduced. Nanocrystals may be formed by performing heat treatment on amorphous materials. The arrangement of internal atoms in the amorphous materials and the nanocrystals is irregular.

SUMMARY

Embodiments of the present disclosure provide a method for processing soft magnetic metallic materials. The technical solutions are as follows:

A method for processing soft magnetic metallic materials is provided. The method including: applying a surface treatment agent to the soft magnetic metallic materials by a heat treatment process, to increase the magnetic induction intensity of the soft magnetic metallic materials, wherein the surface treatment agent includes carbon and/or nitrogen, and the soft magnetic metallic materials are amorphous materials, nanocrystals, silicon steel, or pure iron.

In a possible implementation, the amorphous materials are iron-based amorphous materials or cobalt-based amorphous materials; and the nanocrystals are iron-based nanocrystals.

In a possible implementation, the soft magnetic metallic materials are in a sheet structure.

In a possible implementation, the amorphous materials are amorphous strips;

the nanocrystals are nanocrystal strips; and the silicon steel is silicon steel strips.

In a possible implementation, the soft magnetic metallic materials are in a powdered structure.

In a possible implementation, the surface treatment agent is a carbon source, and the soft magnetic metallic materials are carburized with the carbon source.

In a possible implementation, the surface treatment agent further includes a carburizing promoter.

In a possible implementation, the surface treatment agent further includes carbon powder and/or graphite powder.

In a possible implementation, the surface treatment agent is a carbonitriding agent, and the soft magnetic metallic materials are carbonitrided with the carbonitriding agent.

In a possible implementation, the carbonitriding agent is a mixture of a carbon source and a nitrogen source.

In a possible implementation, the carbon source is an oily carbon source or a resin carbon source; and the nitrogen source is an ammonia nitrogen source or an amine nitrogen source.

In a possible implementation, the carbon source further includes carbon powder and/or graphite powder.

In a possible implementation, the carbonitriding agent is an organic compound containing carbon and nitrogen.

In a possible implementation, before the heat treatment is performed, the carbon source is placed on a surface of the soft magnetic metallic materials by a coating process.

In a possible implementation, before the heat treatment is performed, the carbon source is placed on a surface of the soft magnetic metallic materials by a vacuum impregnation process.

In a possible implementation, during the heat treatment, the soft magnetic metallic materials are immersed in the carbon source.

In a possible implementation, before the heat treatment is performed, the carbon source is placed on a surface of the soft magnetic metallic materials; and then during the heat treatment, the nitrogen source which is in a gaseous form is introduced.

In a possible implementation, the carbon source is placed on the surface of the soft magnetic metallic materials by a coating process, a dripping process or a vacuum impregnation process.

In a possible implementation, during the heat treatment, the soft magnetic metallic materials are immersed in the carbon source which is in a liquid form, and the nitrogen source which is in a gaseous form is then introduced.

In a possible implementation, the heat treatment is performed under a temperature between 200° C. to 1000° C.; and duration of the heat treatment is greater than or equal to 5 minutes.

DETAILED DESCRIPTION

For clearer descriptions of the objectives, technical solutions, and advantages of the present disclosure, embodiments of the present disclosure are described in further detail hereinafter.

The magnetic induction intensity (which is often denoted by the symbol B, and is referred to as a B value for short) of the soft magnetic metallic materials in the related art is relatively low. When the soft magnetic metallic materials are applied in electrical equipment, the usage of the metallic materials needs to be increased to obtain a higher magnetic induction intensity, which will lead to an increased cost. In this way, the application of the soft magnetic metallic materials in the field of electricity is limited.

Embodiments of the present disclosure provide a method for processing soft magnetic metallic materials. The method includes: applying a surface treatment agent to the soft magnetic metallic materials by a heat treatment process to increase the magnetic induction intensity of the soft magnetic metallic materials, wherein the surface treatment agent includes carbon and/or nitrogen; and the soft magnetic metallic materials are amorphous materials, nanocrystals, silicon steel, or pure iron.

In the method for processing soft magnetic metallic materials provided in the embodiments of the present disclosure, soft magnetic metallic materials can be carburized, nitrided or carbonitrided with a surface treatment agent through a heat treatment. After the heat treatment, iron in the soft magnetic metallic materials and carbon will form a cementite. The cementite is magnetic, so that the magnetic induction intensity (also referred to as magnetic flux density or a B value) of the soft magnetic metallic materials can be significantly increased. After the heat treatment, the iron in the soft magnetic metallic materials and nitrogen will form iron nitride $Fe_4N$. The iron nitride $Fe_4N$ is also magnetic, so that the magnetic induction intensity of the soft magnetic metallic materials can also be increased. Therefore, by means of the method provided in the embodiments of the present disclosure, the magnetic induction intensity of the soft magnetic metallic materials can be effectively increased, so that the soft magnetic metallic materials can find more beneficial applications in the field of electricity.

It is found in a research that after the silicon steel is carburized and/or nitrided, the internal resistance of the silicon steel can be further increased, and the eddy current loss of the silicon steel can be reduced.

Here, the iron in the soft magnetic metallic materials discussed above not only include iron at a surface of the soft magnetic metallic materials but also iron inside the soft magnetic metallic materials (for example, a portion of iron close to the surface). It may be understood that the chemical formula of the above cementite is $Fe_3C$.

In the embodiments of the present disclosure, the amorphous materials are iron-based amorphous materials or cobalt-based amorphous materials, and the nanocrystals are iron-based nanocrystals.

In an example, the soft magnetic metallic materials in the embodiments of the present disclosure are in a sheet structure, and for example, in a flake structure, so as to facilitate the application of the soft magnetic metallic materials in the electrical equipment such as motors and transformers. In an example, the amorphous materials are amorphous strips, the nanocrystals are nanocrystal strips, and the silicon steel is silicon steel strips. Of course, devices in various shapes that are manufactured by using the above amorphous strips, nanocrystal strips, or the silicon steel strips are also within the protection scope of the embodiments of the present disclosure. By means of the processing method provided by the embodiments of the present disclosure, the same effect of increasing the magnetic induction intensity can be achieved.

In another example, the soft magnetic metallic materials in the embodiments of the present disclosure are in a powdered structure. For example, the amorphous materials are amorphous powder, the nanocrystals are nanocrystal powder, the silicon steel is silicon steel powder, and the pure iron is pure iron powder. Further, the pure iron is, for example, pure iron powder. In this way, the application of the soft magnetic metallic materials in electrical equipment such as inductors can be facilitated.

A processing process in the embodiments of the present disclosure may include the following steps.

The soft magnetic metallic materials are carburized with a surface treatment agent containing carbon. For example, the amorphous strips, nanocrystal strips or silicon steel strips are carburized respectively.

The soft magnetic metallic materials are nitrided with a surface treatment agent containing nitrogen. For example, the amorphous strips, nanocrystal strips or silicon steel strips are nitrided respectively.

The soft magnetic metallic materials are carbonitrided with a surface treatment agent containing carbon and nitrogen. For example, the amorphous strips, nanocrystal strips or silicon steel strips are carbonitrided respectively.

The surface treatment agent containing carbon may be a carbon source, and the soft magnetic metallic materials are carburized with the carbon source.

There are various types of carbon sources. The carbon sources may include an organic carbon source and an inorganic carbon source. For example, the organic carbon source includes, but is not limited to, an oily carbon source, a resin carbon source, a carbohydrate carbon source, a fatty acid carbon source, or the like. The inorganic carbon source includes, but is not limited to, carbon dioxide.

When the soft magnetic metallic materials such as the amorphous materials, nanocrystals or silicon steel are in a strip structure, to further facilitate the combination of the carbon source and the amorphous strips, as an example, before the heat treatment, the carbon source used in the embodiments of the present disclosure may be an oily carbon source or a resin carbon source.

For example, the oily carbon source includes, but is not limited to, an oil carbon source, or a fat carbon source. For example, the oil carbon source may be vegetable oil (such as bean oil, etc.), mineral oil (such as petroleum, or a byproduct of petroleum, etc.), organic synthetic oil, or the like. As an oil carbon source which is thermally conductive, Dowtherm contributes to increase a carburization quantity during the heat treatment process, and can be used as the carbon source in the embodiments of the present disclosure.

For example, the resin carbon source includes, but is not limited to, epoxy resin, phenolic resin, alkyd resin, rosin, or the like. These resins are adhesive, and can be conveniently adhered to the surface of the amorphous strips, nanocrystal strips, or silicon steel strips.

To further increase the carburization quantity, the surface treatment agent provided in the embodiments of the present disclosure may further include carbon powder and/or graphite powder.

In an example, the carbon powder and/or graphite powder may be mixed into the oil carbon source or the resin carbon source, to form a carbon source with higher carbon content. Doping mass of the carbon powder and/or graphite powder may account for 5% to 50%, for example, 10%, 15%, 20%, 30% and so on, of the total mass of the carbon source.

When the carbon powder and the graphite powder both exist, a mass ratio of the carbon powder to the graphite powder may be any mass ratio value.

Particle sizes of the carbon powder and the graphite powder are both controlled in a nanometer scale, for example, between 5 nanometers to 50 nanometers, so as to improve a carburization effect.

The surface treatment agent provided in the embodiments of the present disclosure may further include a carburizing promoter. The carburizing promoter may be $BaCO_3$, $CaCO_3$, $Na_2CO_3$, or the like. Doping mass of the carburizing promoter may account for 10% or less, for example, 2% to 10%, of the total mass of the carbon source. For example, the percentage may be 3%, 4%, 5%, 6%, or the like.

In an example, such type of surface treatment agent may be provided, including: an oil carbon source and/or a resin carbon source, carbon powder and/or graphite powder, and a carburizing promoter.

In another example, such type of surface treatment agent may be provided, including: an oil carbon source and/or a resin carbon source and a carburizing promoter.

In still another example, such type of surface treatment agent may be provided, including: an oil carbon source and/or a resin carbon source, and carbon powder and/or graphite powder.

In still another example, such type of surface treatment agent may be provided, including: an oil carbon source and/or a resin carbon source.

The surface treatment agent containing nitrogen may be a nitrogen source, and the nitrogen source may be an ammonia nitrogen source or an amine nitrogen source. For example, the nitrogen source may be ammonia gas, and the nitriding treatment may be performed by introducing ammonia gas. Alternatively, the nitrogen source may be triethanolamine, urea, or the like, and the nitriding treatment may be performed by means of dripping or immersion.

The surface treatment agent containing both carbon and nitrogen may be a carbonitriding agent, and the soft magnetic metallic materials are carbonitrided with the carbonitriding agent. For example, the amorphous strips, nanocrystal strips or silicon steel strips are carbonitrided with the carbonitriding agent.

The soft magnetic metallic materials are carbonitrided with the carbonitriding agent by a heat treatment process. During the carbonitriding process, iron in the soft magnetic metallic materials and carbon will form a cementite $Fe_3C$, and the iron in the soft magnetic metallic materials and nitrogen will form an iron nitride $Fe_4N$. Since the cementite $Fe_3C$ and the iron nitride $Fe_4N$ are both magnetic, with the combination of both the cementite and the iron nitride, the magnetic induction intensity of the soft magnetic metallic materials can be significantly increased.

It may be understood that, by performing a carbonitriding treatment on the soft magnetic metallic materials, carbonitrided compounds can be formed on the surface and in the interior of the soft magnetic metallic materials. In addition, according to the principle of carbonitriding, the carburization quantity should be greater than the nitriding quantity. That is, the carburization is dominant, and the nitriding is auxiliary.

The carbonitriding agent can provide both carbon and nitrogen. The carbonitriding agent may be a mixture. That is, the carbonitriding agent may be a mixture of a carbon source and a nitrogen source; or may be a compound containing both a carbon element and a nitrogen element. That is, the carbonitriding agent is organic compound containing both carbon and nitrogen. For both forms of carbonitriding agents, a mole ratio of carbon element to nitrogen element as contained may be 2 to 5:1, so as to ensure that the carburization quantity is greater than the nitriding quantity.

When the carbonitriding agent is a mixture of a carbon source and a nitrogen source, both the carbon source and the nitrogen source may be in a gaseous form or a liquid form, and may be in the same form or may be in different forms.

When the carbon source and the nitrogen source are both in a gaseous form, during the heat treatment, the soft magnetic metallic materials may be placed in a flowable carbonitriding agent atmosphere, or the carbonitriding agent may be continuously introduced into the reaction system of the soft magnetic metallic materials for a particular time period.

When the carbon source and the nitrogen source are both in a liquid form, during the heat treatment, the soft magnetic metallic materials may be immersed in the carbonitriding agent.

For example, the carbon source may include an organic carbon source and an inorganic carbon source. The organic carbon source includes, but is not limited to, an oily carbon source, a resin carbon source, a carbohydrate carbon source, a fatty acid carbon source, an organic alcohol carbon source, an organic ketone carbon source, or the like. The inorganic carbon source includes, but is not limited to, carbon dioxide, and so on.

In consideration of the texture of the soft magnetic metallic materials and the heat treatment process required by the surface treatment, to facilitate the combining of the surface treatment agent and the soft magnetic metallic materials, in the embodiments of the present disclosure, the carbon source may be oily or resin carbon source.

For example, the oily carbon source includes, but is not limited to, an oil carbon source, or a fat carbon source. For example, the oil carbon source may be vegetable oil, mineral oil (such as petroleum, or kerosene, etc.), organic synthetic oil, or the like. As an oil carbon source which is thermally conductive, Dowtherm contributes to increase a carburization quantity during the heat treatment, and can be used as the carbon source in the embodiments of the present disclosure.

For example, the resin carbon source includes, but is not limited to liquid resins such as epoxy resin, phenolic resin, alkyd resin, or the like. These resins are adhesive, and can be conveniently adhered to the surface of the amorphous strips, nanocrystal strips, or silicon steel strips.

To increase the carburization quantity, the surface treatment agent provided in the embodiments of the present disclosure may further include carbon powder and/or graphite powder.

As an example, the carbon powder and/or graphite powder may be mixed into the oil carbon source or the resin carbon source, to form a carbon source with higher carbon content. Doping mass of the carbon powder and/or graphite powder may account for 5% to 95%, for example, 10%, 15%, 20%, 30%, 50%, 70%, 90% and so on, of the total mass of the carbon source.

When the carbon powder and the graphite powder both exist, a mass ratio of the carbon powder to the graphite powder may be any mass ratio value.

Particle sizes of the carbon powder and the graphite powder are both controlled in a nanometer scale, for example, between 5 nanometers to 50 nanometers, so as to improve a carburization effect.

The surface treatment agent provided in the embodiments of the present disclosure may further include a carburizing promoter. The carburizing promoter may be $BaCO_3$, $CaCO_3$, $Na_2CO_3$, or the like. Doping mass of the carburizing promoter may account for 10% or less, for example, 2% to 10%, of the total mass of the carbon source. For example, the percentage may be 3%, 4%, 5%, 6%, or the like.

In an example, such type of surface treatment agent may be provided, including: a nitrogen source, an oil carbon source and/or a resin carbon source, carbon powder and/or graphite powder, and a carburizing promoter.

In another example, such type of surface treatment agent may be provided, including: a nitrogen source, an oil carbon source and/or a resin carbon source, and a carburizing promoter.

In still another example, such type of surface treatment agent may be provided, including: a nitrogen source, an oil carbon source and/or a resin carbon source, and carbon powder and/or graphite powder.

In still another example, such type of surface treatment agent may be provided, including: a nitrogen source, an oil carbon source and/or a resin carbon source.

In the embodiments of the present disclosure, an applicable nitrogen source may be an ammonia nitrogen source or an amine nitrogen source. For example, the ammonia nitrogen source may be ammonia gas, and the carbonitriding treatment may be performed by means of introducing ammonia gas. The amine nitrogen source may be triethanolamine, urea, or the like, and the carbonitriding treatment may be performed by means of dripping or immersion.

When the surface treatment agent is a carbon source, for the combining manner of the carbon source and the soft magnetic metallic materials, as well as the operating parameters during the heat treatment, examples are provided below for demonstration.

In an example, before the heat treatment is performed, the carbon source may be placed on a surface of the soft magnetic metallic materials such as the amorphous materials, nanocrystals or silicon steel by a coating process. For example, the carbon source may be placed, by means of brushing or spraying, on the surface of the soft magnetic metallic materials, such as the amorphous materials, nanocrystals or silicon steel.

In another example, before the heat treatment is performed, the carbon source may be placed on the surface of the amorphous materials or nanocrystals by a vacuum impregnation process. In this way, the carburization quantity can be increased.

In still another example, during the heat treatment, the soft magnetic metallic materials, such as the amorphous materials, nanocrystals or silicon steel, are immersed in the carbon source. For example, when the carbon source includes an oil carbon source, the soft magnetic metallic materials, such as the amorphous materials, nanocrystals or silicon steel, are immersed in the oil, and then an oil-bath heating is performed. In this way, the carburization can be more uniform, and the heating treatment on the heating region can be more uniform, thereby improving a carburization effect.

A heat treatment furnace may be used to carry out the heat treatment process for use in carburization, so that the carburization process can be simple and controllable.

During the carburization by using the heat treatment, a temperature of the heat treatment may be from 200° C. to 1000° C. For example, for the amorphous strips or nanocrystal strips, the temperature of the heat treatment may be from 200° C. to 650° C., for example, from 200° C. to 450° C., may further be 200° C. to 400° C., for example, may be 250° C., 280° C., 300° C., 380° C., 400° C., or the like. For the silicon steel strips, the temperature of the heat treatment may be from 200° C. to 450° C., may further be 200° C. to 400° C., for example, 200° C., 230° C., 250° C., 280° C., 300° C., 310° C., 320° C., 330° C., 340° C., 350° C., 360° C., 370° C., 380° C., 400° C. or the like. Based on different thicknesses of silicon steel strips to be processed, the temperature of the heat treatment may be correspondingly adjusted.

During the heat treatment, duration of the heat treatment is at least greater than 5 minutes, and may be for example, from 5 minutes to 24 hours. Further, for example, for the amorphous strips or nanocrystal strips, the duration of the heat treatment may be from 10 minutes, 30 minutes, 1 hour, 2 hours, 3.5 hours, 5 hours, 6.5 hours, 7 hours, 7.5 hours, or the like. For the silicon steel strips, the duration of the heat treatment may be from 10 minutes, 30 minutes, 1 hour, 2 hours, 3.5 hours, 5 hours, 6.5 hours, 7 hours, 7.5 hours, 15 hours, 24 hours or longer duration. The duration of the heat treatment varies based on the temperature of the heat treatment. For example, when the temperature of the heat treatment is relatively high, a relatively adequate carburization effect can be achieved by using relatively short duration of the heat treatment.

It may be understood that, the carburization quantity of the above soft magnetic metallic materials may be determined by controlling the duration of the heat treatment. The longer the duration of the heat treatment is, the greater the carburization quantity is, and after the duration of the heat treatment reaches a particular value, the carburization quantity remains stable.

In an example, the amorphous strips may be immersed in Dowtherm (that is, an oil bath), and placed in the heat treatment furnace for heat treatment, so as to obtain carburized amorphous strips. The temperature of the heat treatment is controlled at 320° C., and the duration of the heat treatment is controlled at 6 hours.

The magnetic induction intensities (that is, saturated magnetic induction intensity) of the amorphous strips, before and after the carburization in the above examples, were respectively measured with a fluxmeter sold by LakeShore (a US company). The measurement results showed that before the carburization, the magnetic induction intensity of the amorphous strips was 1.598 T (i.e., Tesla), and after the carburization, the magnetic induction intensity of the amorphous strips was 1.651 T.

In another example, the amorphous strips may be immersed in Dowtherm (that is, an oil bath), and placed in the heat treatment furnace for heat treatment, so as to obtain carburized amorphous strips. The temperature of the heat treatment is controlled at 320° C., and the duration of the heat treatment is controlled at 7.5 hours.

The magnetic induction intensities of the amorphous strips, before and after the carburization in the above examples, were respectively measured with a fluxmeter sold by LakeShore (US). The measurement results showed that before the carburization, the magnetic induction intensity of the amorphous strips was 1.598 T, and after the carburization, the magnetic induction intensity of the amorphous strips was 1.718 T.

In another example, the amorphous strips may be immersed in Dowtherm (that is, an oil bath), and placed in the heat treatment furnace for heat treatment, so as to obtain carburized amorphous strips. The temperature of the heat treatment is controlled at 320° C., and the duration of the heat treatment is controlled at 7.5 hours.

The magnetic induction intensities of the amorphous strips, before and after the carburization in the above examples, were respectively measured with a fluxmeter sold by LakeShore (US). The measurement results showed that before the carburization, the magnetic induction intensity of the amorphous strips was 1.62 T, and after the carburization, the magnetic induction intensity of the amorphous strips was 1.86 T.

As can be seen from the above specific examples that, by means of the processing method provided in the embodiments of the present disclosure, after the amorphous strips, nanocrystal strips or silicon steel strips are processed, the magnetic induction intensity thereof is significantly increased, and as the duration of the heat treatment prolongs, the magnetic induction intensity is increased more significantly.

When the surface treatment agent is a carbonitriding agent and the carbonitriding agent includes a carbon source and a nitrogen source, for the combining manner of the carbonitriding agent and the amorphous materials or nanocrystals, as well as the operating parameters during the heat treatment, examples are provided below for demonstration.

In an example, before the heat treatment is performed, the carbon source is placed on the surface of the amorphous materials or nanocrystals by a coating, dripping or vacuum impregnation process, and during the heat treatment, the nitrogen source which is in a gaseous form is introduced.

For example, the carbon source may be placed on the surface of the amorphous materials by means of methods such as brushing, spraying, or dripping, and the heat treatment is subsequently performed on the amorphous materials or nanocrystals. In addition, during the heat treatment, ammonia gas may be introduced. Further, for example, during the carbonitriding process, the carbon source may be placed on the surface of the amorphous materials or nanocrystals by means of dripping kerosene, ethanol, or acetone, and ammonia gas is then introduced. Alternatively, carbonitriding may further be performed by means of dripping triethanolamine or alcohol in which urea is dissolved consecutively.

In another example, during the heat treatment, the amorphous materials or nanocrystals are immersed in the carbon source which is in a liquid form, and the nitrogen source which is in a gaseous form is introduced.

For example, when the carbon source is Dowtherm, the amorphous materials or nanocrystals may be immersed in Dowtherm, and nitrogen gas is then introduced, and oil bath heating is performed. In this way, carbonitriding is uniform, and the heat treatment on the heating region can be more uniform, thereby improving a carbonitriding effect.

In still another example, during the heat treatment, the amorphous materials or nanocrystals are directly immersed in the carbonitriding agent which is in a liquid form.

In still another example, during the heat treatment, the soft magnetic metallic materials, such as the amorphous materials, nanocrystals or silicon steel, are placed in the carbonitriding agent which is in a gaseous form.

For example, the carbon source may be organic alcohol, and the nitrogen source may be urea. The carbon source and the nitrogen source may be mixed to form a carbonitriding agent which is in a liquid form. During application, the amorphous materials are immersed in the carbonitriding agent and then a heat treatment is performed.

A heat treatment furnace may be used to carry out the heat treatment, so that the carbonitriding process can be simple and controllable.

During the carbonitriding by using the heat treatment, a temperature of the heat treatment may be from 200° C. to 1000° C. For example, for the amorphous strips or nanocrystal strips, the temperature of the heat treatment may be from 200° C. to 650° C., for example, 200° C. to 450° C., and may further be from 200° C. to 400° C., for example, may be 250° C., 280° C., 300° C., 380° C., 400° C., or the like. For the silicon steel strips, the temperature of the heat treatment may be from 200° C. to 450° C., may further be from 200° C. to 400° C., for example, 200° C., 230° C., 250° C., 280° C., 300° C., 310° C., 320° C., 330° C., 340° C., 350° C., 360° C., 370° C., 380° C., or 400° C. Based on different thicknesses of the silicon steel strips to be processed, the temperature of the heat treatment may be correspondingly adjusted.

During the heat treatment, duration of the heat treatment is at least greater than 5 minutes, and may be for example, from 5 minutes to 24 hours. Further, for example, for the amorphous strips or nanocrystal strips, the duration of the heat treatment may be 10 minutes, 30 minutes, 1 hour, 2 hours, 3.5 hours, 5 hours, 6.5 hours, 7 hours, 7.5 hours, or the like. For the silicon steel strips, the duration of the heat treatment may be 10 minutes, 30 minutes, 1 hour, 2 hours, 3.5 hours, 5 hours, 6.5 hours, 7 hours, 7.5 hours, 15 hours, 24 hours, or the like. The duration of the heat treatment varies based on the temperature of the heat treatment. For example, when the temperature of the heat treatment is relatively high, a relatively adequate carbonitriding effect can be achieved by using relatively shorter duration of the heat treatment.

It may be understood that, a carbonitriding quantity of the soft magnetic metallic materials may be determined by controlling the duration of the heat treatment. The longer the duration of the heat treatment is, the greater the carbonitriding quantity is and after the duration of the heat treatment reaches a particular value, the carbonitriding quantity remains stable.

In an example, the amorphous strips may be immersed in Dowtherm (that is, an oil bath), and placed in the heat treatment furnace for heat treatment, and during the heat treatment, ammonia gas is then introduced into the heat treatment furnace, so as to obtain carbonitrided amorphous strips. The temperature of the heat treatment is controlled at 350° C., and the duration of the heat treatment is controlled at 6 hours.

The magnetic induction intensities of the amorphous strips, before and after the carbonitriding in the above examples, were respectively measured with a fluxmeter sold by LakeShore (US). The measurement results showed that before the carbonitriding, the magnetic induction intensity of the amorphous strips was 1.54 T, and after the carbonitriding, the magnetic induction intensity of the amorphous strips was 1.646 T.

In another example, the amorphous strips may be immersed in Dowtherm (that is, an oil bath), and placed in the heat treatment furnace for heat treatment, and during the heat treatment, ammonia gas is then introduced into the heat treatment furnace, so as to obtain carbonitrided amorphous strips. The temperature of the heat treatment is controlled at 360° C., and the duration of the heat treatment is controlled at 7.5 hours.

The magnetic induction intensities of the amorphous strips, before and after the carbonitriding in the above examples, were respectively measured with a fluxmeter sold by LakeShore (US). The measurement results showed that before the carbonitriding, the magnetic induction intensity of the amorphous strips was 1.54 T, and after the carbonitriding, the magnetic induction intensity of the amorphous strips was 1.7 T.

In still another example, the amorphous strips may be immersed in Dowtherm (that is, an oil bath), and are placed in the heat treatment furnace for heat treatment, and during the heat treatment, ammonia gas is then introduced into the heat treatment furnace, so as to obtain carbonitrided amorphous strips. The temperature of the heat treatment is controlled at 650° C., and the duration of the heat treatment is controlled at 9 hours.

The magnetic induction intensities of the amorphous strips, before and after the carbonitriding in the above examples, were respectively measured with a fluxmeter sold by LakeShore (US). The measurement results showed that before the carbonitriding, the magnetic induction intensity of the amorphous strips was 1.62 T, and after the carbonitriding, the magnetic induction intensity of the amorphous strips was 1.87 T.

In an example, the silicon steel strips may be immersed in Dowtherm (that is, an oil bath, and high-pressure seal are performed), and placed in the heat treatment furnace for heat treatment, and during the heat treatment, ammonia gas is then introduced into the heat treatment furnace, so as to obtain carbonitrided silicon steel strips. The temperature of the heat treatment is controlled at 350° C., and the duration of the heat treatment is controlled at 6 hours.

The magnetic induction intensities of the silicon steel strips, before and after the carbonitriding in the above examples, were respectively measured with a fluxmeter sold by LakeShore (US). The measurement results showed that before the carbonitriding, the magnetic induction intensity of the silicon steel strips was 2.03 T, and after the carbonitriding, the magnetic induction intensity of the silicon steel strips was 2.2 T.

In an example, the silicon steel strips may be immersed in Dowtherm, and placed in the heat treatment furnace for heat treatment, and during the heat treatment, ammonia gas is then introduced into the heat treatment furnace, so as to obtain carbonitrided silicon steel strips. The temperature of the heat treatment is controlled at 450° C., and the duration of the heat treatment is controlled at 7.5 hours.

The magnetic induction intensities of the silicon steel strips, before and after the carbonitriding in the above examples, were respectively measured with a fluxmeter sold by LakeShore (US). The measurement results showed that before the carbonitriding, the magnetic induction intensity of the silicon steel strips was 2.03 T, and after the carbonitriding, the magnetic induction intensity of the silicon steel strips was 2.24 T.

In an example, the silicon steel strips may be immersed in Dowtherm, and placed in the heat treatment furnace for heat treatment, so as to obtain carburized silicon steel strips. The temperature of the heat treatment is controlled at 400° C., and the duration of the heat treatment is controlled at 6 hours.

The magnetic induction intensities of the silicon steel strips, before and after the carbonitriding in the above examples, were respectively measured with a fluxmeter sold by LakeShore (US). The measurement results showed that before the carbonitriding, the magnetic induction intensity of the silicon steel strips was 2.03 T, and after the carbonitriding, the magnetic induction intensity of the silicon steel strips was 2.12 T.

In an example, the silicon steel strips may be placed in the heat treatment furnace for heat treatment, so as to obtain carbonitrided silicon steel strips. During the heat treatment, ammonia gas is then introduced into the heat treatment furnace, so as to obtain nitrided silicon steel strips. The temperature of the heat treatment is controlled at 800° C., and the duration of the heat treatment is controlled at 6 hours.

The magnetic induction intensities of the silicon steel strips, before and after the carbonitriding in the above examples, were respectively measured with a fluxmeter sold by LakeShore (US). The measurement results showed that before the carbonitriding, the magnetic induction intensity of the silicon steel strips was 1.9 T, and after the carbonitriding, the magnetic induction intensity of the silicon steel strips was 2.06 T.

As can be seen the above specific examples that, after the silicon steel processed by the method for processing silicon steel provided in the embodiments of the present disclosure, the magnetic induction intensity of the silicon steel can be significantly increased, and as the duration of the heat treatment prolongs, the magnetic induction intensity is increased more significantly.

As can be seen from above disclosure, after the soft magnetic metallic materials are carbonitrided by using the processing method provided in the embodiments of the present disclosure, the magnetic induction intensity of the soft magnetic metallic materials can be significantly increased, and as the duration of the heat treatment prolongs, the magnetic induction intensity is increased more significantly.

Described above are merely preferred embodiments of the present disclosure, and are not intended to limit the present disclosure. Within the spirit and principles of the disclosure, any modifications, equivalent substitutions, improvements, and the like shall be covered by the protection scope of this application.

What is claimed is:

1. A method for increasing magnetic induction intensity of soft magnetic metallic materials, the method comprising:

carburizing or carbonitriding the soft magnetic metallic materials with the carbon source or a carbonitriding agent by a heat treatment process, to increase the magnetic induction intensity of the soft magnetic metallic materials, wherein the soft magnetic metallic materials are selected from at least one of amorphous materials, nanocrystals, silicon steel, or pure iron;

wherein the carbonitriding agent is a mixture of the carbon source and a nitrogen source, a mole ratio of carbon to nitrogen in the carbonitriding agent ranges from 2:1 to 5:1, and the nitrogen source is an ammonia nitrogen source or an amine nitrogen source;

wherein the carburizing further comprises carburizing the soft magnetic metallic materials with the carbon source and a carburizing promoter; and wherein the carbon source is an oily carbon source or a resin carbon source, wherein the oily carbon source comprises an oil carbon source and a fat carbon source; a surface treatment agent for the carburizing or the carbonitriding further comprises a carbon powder or graphite powder, and the carburizing promoter, wherein a doping mass of the at least one of the carbon powder or graphite powder accounts for 5% to 50% of a total mass of the carbon source, particle sizes of the carbon powder and the graphite powder are both controlled in a nanometer scale, and a doping mass of the carburizing promoter accounts for 10% or less of the total mass of the carbon source.

2. The method according to claim 1, wherein:

the amorphous materials are iron-based amorphous materials or cobalt-based amorphous materials; and the nanocrystals are iron-based nanocrystals.

3. The method according to claim 1, wherein the soft magnetic metallic materials are in a sheet structure.

4. The method according to claim 3, wherein:

the amorphous materials are amorphous strips;

the nanocrystals are nanocrystal strips; and the silicon steel is silicon steel strips.

5. The method according to claim 1, wherein the soft magnetic metallic materials are in a powdered structure.

6. The method according to claim 1, wherein before the heat treatment process is performed, the carbon source is placed on a surface of the soft magnetic metallic materials by a coating process.

7. The method according to claim 1, wherein before the heat treatment process is performed, the carbon source is placed on a surface of the soft magnetic metallic materials by a vacuum impregnation process.

8. The method according to claim 1, wherein during the heat treatment process, the soft magnetic metallic materials are immersed in the carbon source.

9. The method according to claim 1, wherein before the heat treatment process is performed, the carbon source is placed on a surface of the soft magnetic metallic materials; and then during the heat treatment process, the nitrogen source which is in a gaseous form is introduced.

10. The method according to claim 9, wherein the carbon source is placed on the surface of the soft magnetic metallic materials by a coating process, a dripping process, or a vacuum impregnation process.

11. The method according to claim 1, wherein during the heat treatment process, the soft magnetic metallic materials are immersed in the carbon source which is in a liquid form, and the nitrogen source which is in a gaseous form is then introduced.

12. The method according to claim 1, wherein:

the heat treatment process is performed at a temperature between 200° ° C. to 1000° C.; and duration of the heat treatment process is greater than or equal to 5 minutes.

* * * * *